S. S. KURTZ, Jr.
METALLIC ROD PACKING.
APPLICATION FILED OCT. 17, 1917.

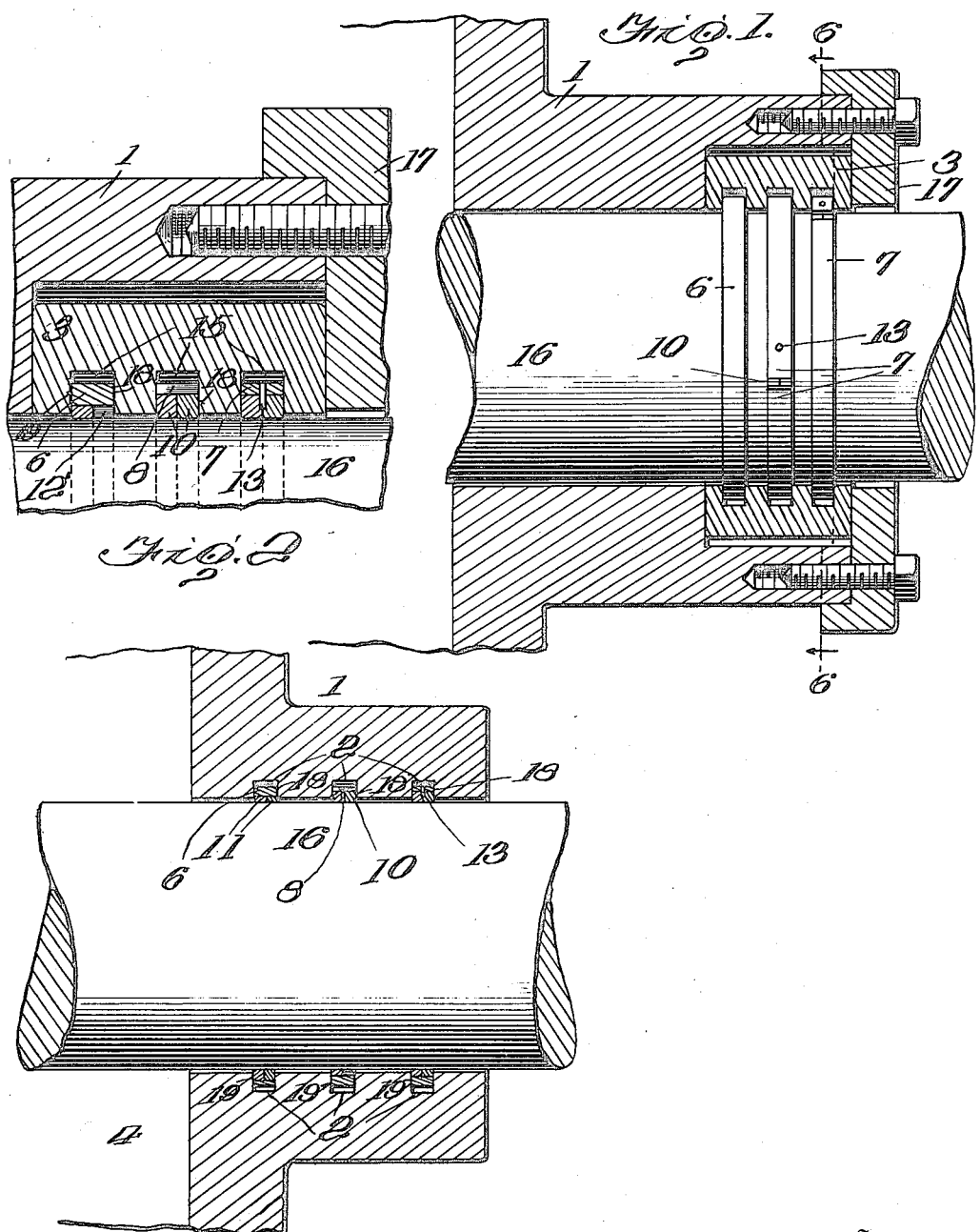

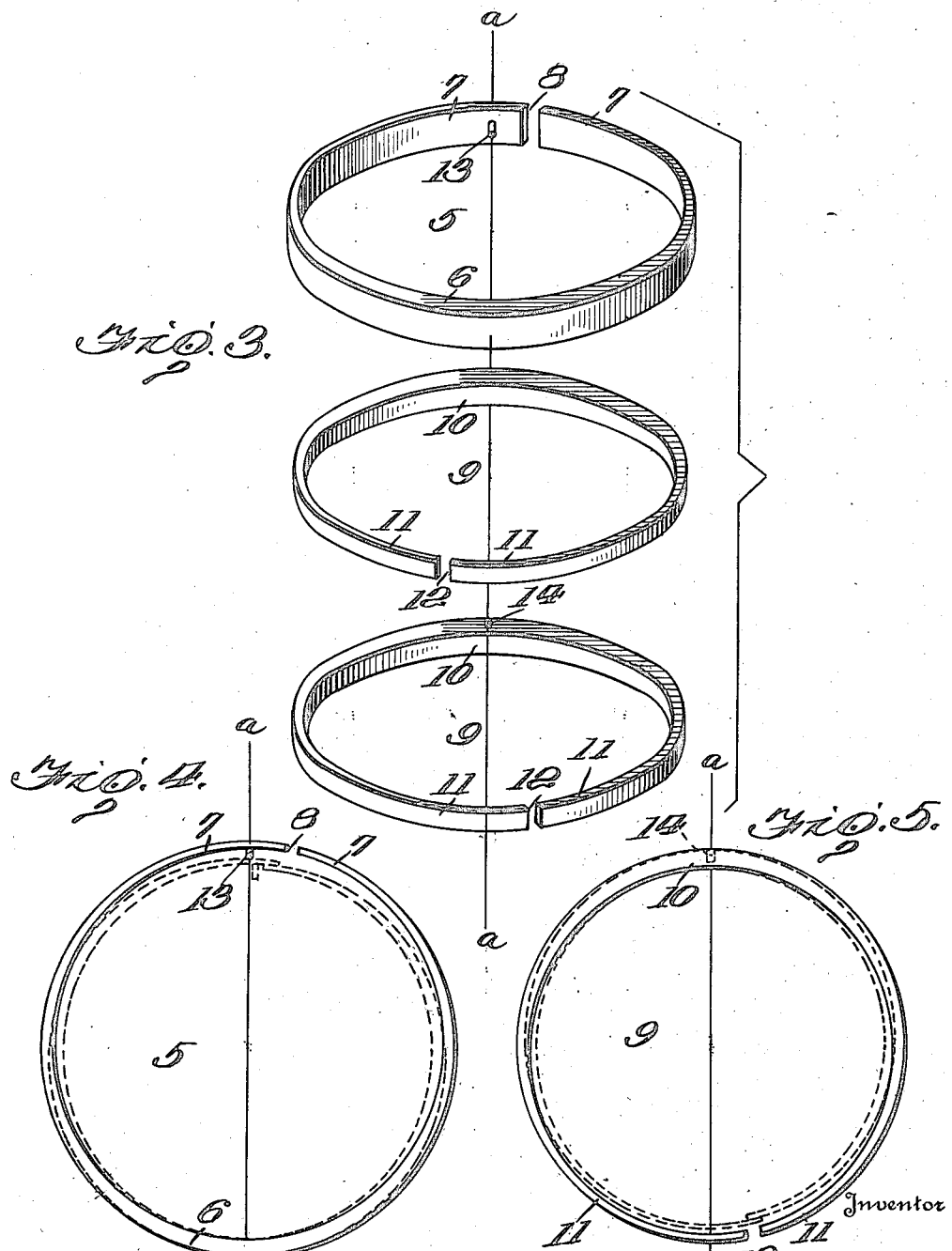

1,424,655.

Patented Aug. 1, 1922.
4 SHEETS—SHEET 3.

S. S. KURTZ, Jr.
METALLIC ROD PACKING.
APPLICATION FILED OCT. 17, 1917.
1,424,655.
Patented Aug. 1, 1922.
4 SHEETS—SHEET 4.
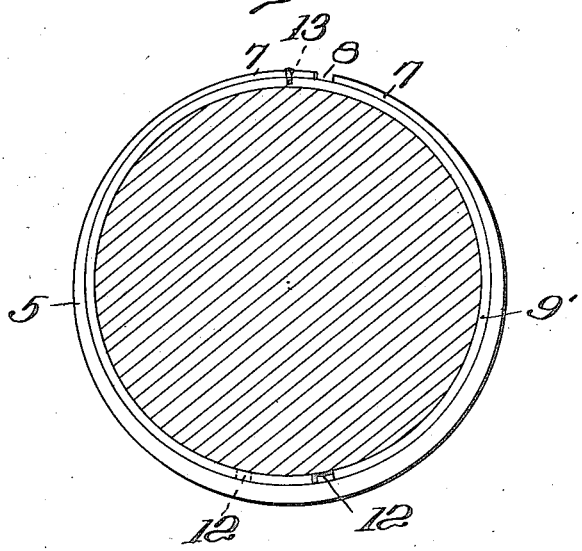
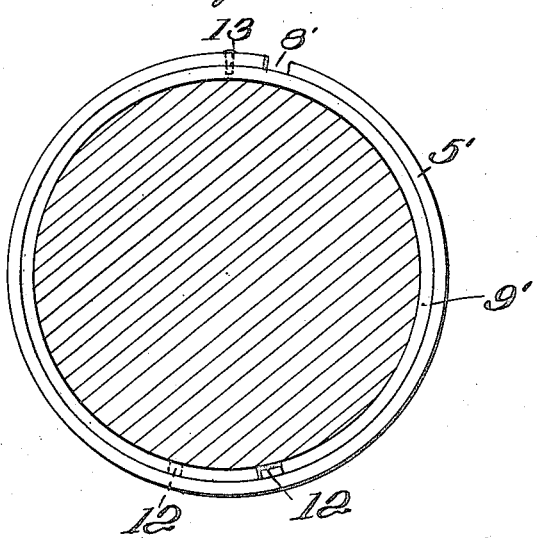

UNITED STATES PATENT OFFICE.

STEWART S. KURTZ, JR., OF CANTON, OHIO.

METALLIC ROD PACKING.

1,424,655. Specification of Letters Patent. Patented Aug. 1, 1922.

Application filed October 17, 1917. Serial No. 197,153.

*To all whom it may concern:*

Be it known that I, STEWART S. KURTZ, Jr., a citizen of the United States, residing at Canton, in the county of Stark and State of Ohio, have invented certain new and useful Improvements in Metallic Rod Packings, of which the following is a specification, reference being had therein to the accompanying drawing.

This invention relates to improvements in metallic rod packing and its most general application is in connection with the piston rods and valve stems or rods of steam engines, although it is equally adapted to be used for making a tight packing for reciprocating rods wherever a packing is desired.

My improved metallic packing ring for piston rods or the like comprises two inner rings and an outer ring embracing the two inner rings, thus constituting a three ring structure. The two inner rings have a combined width equal to the width of the outer ring when placed side by side and embraced within the outer ring. The two inner rings constitute the rod bearing packing, while the outer ring performs the double function of sealing the expansion joints or openings of the two inner rings, and also acting as a contracting spring ring to hold the inner packing rings in contact with the rod. The inner faces or peripheries of the two inner rings have true circles when the rings are in their expanded working positions to make a gas tight fit with the rod; the improvement further embodies having the inner periphery of the outer ring, and the outer peripheries of the inner rings with true circles, and especially at the expansion opening zone of the inner rings when they are in their expanded working positions, to make a gas tight seal or closure of the expansion openings of the inner rings.

My improved ring further embodies the having of each of the rings of eccentric form, with the expansion openings made in the thin side of each of the rings, and having the three rings so assembled that the thick portion of the outer ring forms a seal or a packing for the expansion openings in the inner rings, and having the two inner rings so constructed and assembled that their expansion openings are out of line with each other, so that the ends of these two inner rings overlap each other so that the openings do not open one to the other, and thus further closing the expansion openings by the overlapping ends of the two inner rings.

My improvement further embodies a structure each ring of which has the characteristic, that when they are respectively in their free state and contracted position, their two ends overlap, and that when they are expanded and in working position the ends are withdrawn from their overlapping position, leaving a desired predetermined size expansion opening between the ends.

My improvement further embodies the novel provision of means for locking the three rings against any relative circumferential movement when they are in their working positions.

My improvement further embodies the arrangement and provision of locking means so located in respect to the three rings that the two inner rings are duplicates.

In the accompanying drawings

Figure 1 is a sectional view showing my improved rod packing applied to a rod, the packing shown in edge elevation, and carried by a grooved member through which the rod works.

Figure 2 is a sectional view of a portion of a piston rod stuffing box with my improved packing rings in position therein, the packing rings shown in sections, and in a carrying member through which the rod works.

Figure 3 is a perspective view of the three rings which constitute the preferred form of my improved packing ring, the rings shown in disassembled positions.

Figure 4 is a detached plan view of the outer spring contracting ring, shown in full lines in its working position, and in dotted lines in its contracted position.

Figure 5 is a plan view of one of the inner rings, it being shown in its working position in full lines, and in its contracted position in dotted lines.

Figure 9 is a sectional view of a stuffing box of an engine cylinder with the piston rod passing therethrough, and the inner surface of the stuffing box provided with grooves to receive my packing rings, instead of having a separate groove member for receiving the packing rings.

Figure 10 is a plan view of my improved packing in which the two inner rings are made in concentric form combined with an eccentric outer ring.

Figure 11 is a plan view of my improved packing in which all three of the rings are made in concentric form.

Figure 6:
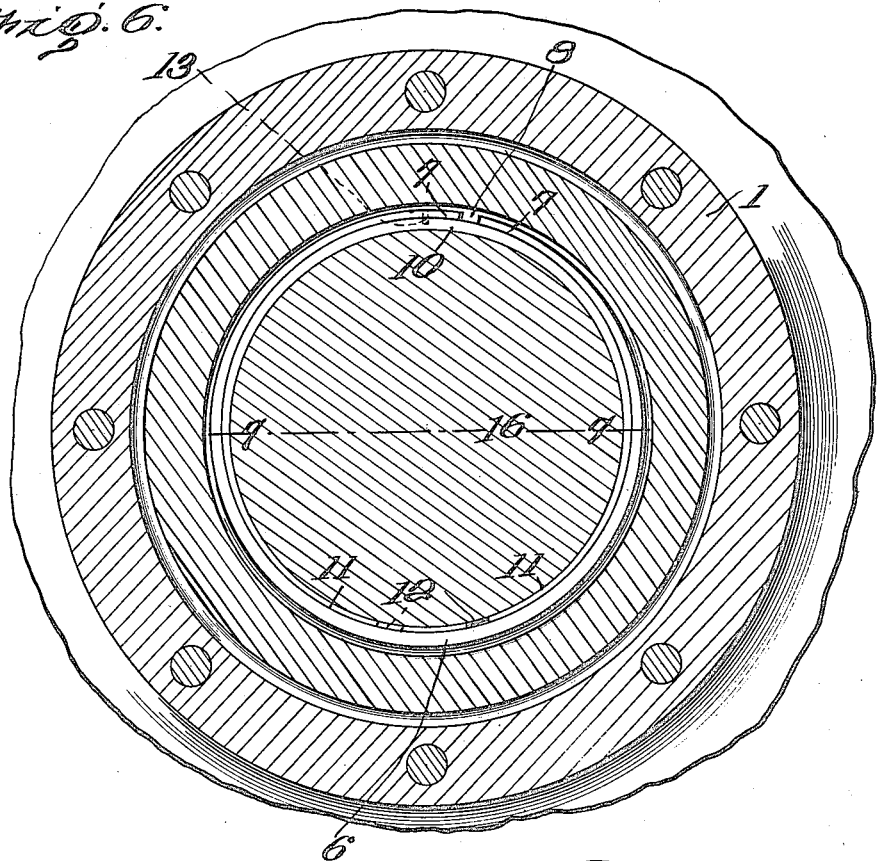
Figure 6 is a transverse sectional view on the line 6—6 of Figure 1, looking in the direction indicated by arrow.
Figure 7:
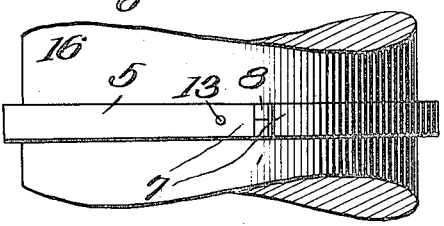
Figure 7 is an edge view of the packing in working position around a piston rod.

While I have shown in Figures 1, 2 and 9 three of my improved packings applied to a piston rod, yet I desire it to be understood that this number of packings is not necessary in all cases, and that my invention is not deviated from by using one packing in connection with a reciprocating rod, nor indeed is it limited to any particular number of packings or rings. In many instances a single packing of my improved construction will be found so efficient as to answer fully the need of a packing for a piston rod.

Referring now to the drawings in which similar reference characters indicate the same parts, 1 is the stuffing box of a piston or other reciprocating rod to which it is desired to apply my improved packing. In applying my packing to a reciprocation rod, it is necessary to provide a groove to receive the packing, and where more than one packing is used, it is advisable to provide separate grooves for each packing. These grooves may be formed directly in the stuffing box as shown at 2, Figure 9, or they may be provided in a separate member 3 as in Figures 1 and 2.

Before taking up the description of the grooved member to receive the packing, I will first describe my improved packing, referring particularly to Figures 3, 4 and 5.

It will be understood, of course, by those skilled in the art, that the rings are made of cast iron but may be made of any other suitable material.

At the top of Figure 3 is shown the outer contracting and embracing ring 5. This ring is of an eccentric form having a thick portion or thick side 6 gradually merging into the thin side 7. This thin side has a piece cut out of it to form an expansion opening 8.

Both of the inner rings 9 are of similar eccentric construction, except they are smaller in diameter than the outer ring and half the width thereof. These like the outer ring are provided with the thick portion 10 which gradually merges into the thin portion or side 11, and they like the outer ring are also cut out to form the expansion opening 12.

Attention is directed to the fact that the expansion openings 8 and 12 of the inner and outer rings, are made at one side of an imaginary line *a—a* drawn through the said rings, Figures 3, 4 and 5. This construction is made so that the three rings can be assembled in a manner to throw the expansion openings out of alignment with each other so that none of the openings open one to the other and the thick and thin portions of the two inner rings perfectly match or register when side by side in working positions. also the thickest portion of the outer ring is on the same side as the thinnest sides of the inner rings.

Figure 8:
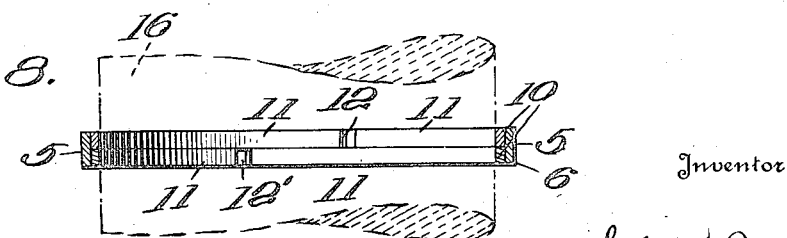
Figure 8 is a view showing the piston rod in sectional and dotted lines, and the packing in transverse section, showing the expansion openings of the inner rings, as well as the transverse relative thickness, width and size of the three rings on a line 7—7 taken through the center Figure 6.

Another feature of my construction consists in providing means for holding the three parts of the packing against circumferential movement when in their working positions and to so arrange the means that the two inner rings can be made duplicates and still interlock with its holding or locking means. The locking means consists in providing one end of the thin portion 7 of the outer ring 5 with an inwardly projecting pin 13, located on said imaginary line and providing the thick portions of the two inner rings 9 with grooves 14, located on said imaginary line and adapted to receive the pin 13. From this it will be observed, that the expansion openings 8 and 12 are formed at one side of this imaginary line while the pin 13 and grooves 14 are formed on this imaginary line. By reason of this construction, the two inner rings can be made duplicates, and when placed in interlocking positions within the outer ring, their expansion openings 12 and 12' will be out of alignment, and the ends of these inner rings overlap as shown in Figure 8, and close the openings in one direction, and the thick portion 6, of the outer ring 5 will close the expansion openings 12 and 12' so that the gas will be prevented from leaking around the rings 9 from the one opening 12 to the other 12' or vice versa, or passing the packing, thus making a tight seal of the expansion joints of the two inner packing rings.

In Figure 6 the packing ring is shown in plan view, and from this figure it will be seen that the thick portion of the outer ring 5 is on the same side of the packing as the thin sides or portions 11 of the inner rings 9, and also at the expansion openings 12 and 12'.

Therefore, it will be understood from the description thus far given, that my improved packing ring in the preferred form is made up of three members, two inner duplicate rings 9, and an outer embracing and contracting ring 5, having a width equal to the combined width of the two inner rings, and it will also be understood, that the expansion openings in all three of these rings are made in them at one side of said imaginary center line, while on the other hand the interlocking pin and grooves of the three members are made on this center line, whereby as before stated the two inner rings can be made duplicates, and whereby the rings are held with their expansion openings out of line so that they do not open one to the other, and the eccentric portions are held in proper working position as seen in Figures 1, 2, 6, 7, 9 and 10.

There is another primary and very important feature of my improvement, which consists in having the inner rings with inner and outer peripheries which are true circles when they are in their expanded working positions, which also means that they are not true circles when in their non-working contracted positions. The having of each of these inner rings with an inner periphery of a true circle when in their working positions, is a very important feature of the improvement, and it is also advantageous to combine with this feature, the outer peripheries of the two inner rings of true circles, and the inner periphery of the outer ring a true circle of the same size as the outer periphery of the inner rings when in their expanded working positions, and particularly at the expansion opening zone of the inner rings to make a gas tight closure.

In carrying out this part of the improvement the rings are first made sufficiently larger in diameter than working size to provide for the metal removed in cutting the expansion openings, they are then so contracted that they will take a permanent set and normally remain in the position shown in dotted lines Figures 4 and 5 so that when expanded to working size, small expansion openings are provided. This is for the purpose of causing them to have a normally contracting action, whereby the inner rings normally contract around the piston rod, and the outer ring normally contracts around the inner rings.

A ring formed in the foregoing manner is very different from a ring formed in the way they have heretofore been made, in that heretofore the rings have been made smaller than working size, the expansion openings formed, and then when expanded to working size, expansion openings result so large that it is impractical to make a gas tight closure of the expansion openings in a three contracting ring structure. After my improved packing rings have been contracted so that they remain in the form shown in dotted lines Figures 4 and 5, they are temporarily expanded to their normal working positions, and the inner and outer peripheries of the inner rings formed to true circles when in their expanded working positions, and the inner periphery of the outer ring is formed to a true circle of the same size as that of the outer periphery of the inner rings when it is in its expanded working position. However, the invention is present when the engaging surfaces of the inner and outer rings are true corresponding arcs only at the expansion opening zone of the inner rings.

While it is desirable that the inner rings be normally contracting this is not absolutely essential, provided the outer ring has a sufficient contracting strength to hold the inner rings against the rod 16.

Heretofore great difficulty has been present in making a tight seal against the rod, and also a tight seal of the expansion joints of the rings in metallic rod packings, and has not heretofore been accomplished. By having the rings with engaging surfaces of true circles when in normally expanded working positions, an absolute fit of the rod 16 is made and an absolute fit is made between the outer ring and the inner rings, at the expansion opening zone of the inner rings, so that there is an absolute positive seal of the expansion joints of the inner rings by the accurate fitting of the outer and inner rings, at the expansion opening zone of the inner rings.

Referring now particularly to Figures 1, 2 and 9, it will be observed that the several grooves 2 for the packing rings are of greater depth than the thickness of the rings. The object of this is to hold the packings in a floating condition, whereby they accommodate themselves to any lateral movement of the rod by reason of the wearing of the stuffing box by the rod, or allowed play for the rod.

Referring now particularly to Figures 1 and 2 attention is directed to the provision of a separate member 3 to receive the packing ring. This member is provided with grooves 15 for receiving the packing rings, and these grooves are made of a greater diameter than the external diameter of the rings, whereby they are permitted, as stated, a floating action for the purpose described. The primary object in providing a member 3 separate from the stuffing box 1, is to accommodate more lateral movement of the piston rod, more than such packing would allow without such a member. The member 3 is held in position by a suitable plate 17 by bolting it to the end of the stuffing box 1, in such manner that the member 3 also can move and produce a floating action, whereby the lateral movement of the rod may be much greater than without the floating holder.

Figure 10 shows my invention embodied in a construction having concentric inner rings 9 used in conjunction with an eccentric outer ring 5. This construction may embody that feature of my improvement which comprises having the inner peripheries of the inner rings 9' with true circles when in expanded working form to make a gas-tight fit with the piston rod 16, and the outer peripheries of the inner rings 9', with true circles especially at and near the expansion openings' zone of the inner rings when in expanded working form, and having that portion of the inner periphery of the outer eccentric ring 5, which lies within the expansion opening zone of the inner rings with an inner periphery of a true circle when in expanded working form around the inner rings to make a gas-tight seal or closure of the expansion openings of the inner rings.

Figure 11 shows my invention embodied in a construction having concentric inner rings 9 as in Figure 10 but combined with an outer concentric spring contracting ring 5'. This construction embodies that part of my improved packing which comprises providing the inner peripheries of the inner rings with true circles when in expanded working forms to make a gas-tight fit with the piston rod, and in providing the inner periphery of the outer ring and the outer peripheries of the inner rings with true circles at the expansion opening zone of the inner rings when in expanded working form.

While the three eccentric ring construction is preferred, and gives an improved result over that accomplished by the constructions of Figures 10 and 11, yet these figures embody that part of my improvement above described which accomplishes a result not before accomplished in metallic piston rod packing or the like.

Attention shall be directed to the fact that these packings will pack equally well when the packing is forced on one side or the other of the grooves in which they are placed, and will pack against a pressure in either direction.

In operation assume the rod 16 is moving to the left in Figures 2 and 9, and there is a high pressure in the cylinder 4. The pressure will hold the packings seated closely and gas tight on the right side of the grooves at 18 and a trifle away from the other side at 19 which allows the pressure gases to pass in the groove behind the ring in the space between the ring and the bottom of the groove and in the left expansion opening 12 but it is stopped from passing farther by the outer ring closing the right opening 12' from the outer side and from passing to the right to opening 12 by the over-lapping end 11 of the left inner ring, and is prevented from passing between the inner and outer rings by their engaging peripheries being constructed to fit perfectly when in normal working form, and from passing between the inner rings' inner peripheries and the rod, by the rod periphery engaging the inner peripheries of the inner rings which are constructed and formed to a true circle and rod fit when in working form, and from passing from bottom of groove at the right side of groove under the inner ring to opening 12' by the close seating fit of the inner ring to the right side 18 of the groove, thus preventing the leakage past the packings.

The packing will pack similarly regardless of which direction the pressure is, or which way the piston rod, rod, or plunger moves on which it is used.

Having thus described my invention what I claim and desire to secure by Letters Patent is:

1. In a metallic contracting rod packing, the combination of an outer eccentric spring contracting ring open in its thin side, two inner eccentric contractable rings each having an opening in its thin side, both mounted within said outer ring side by side with said openings out of communication and with the thick side of the outer ring at the thin open sides of the inner rings and the opening of the outer ring at the thick sides of the inner rings, and means for locking the three rings in their said positions, thus providing two independent rod bearing rings having their ends gradually tapering into the thick portions thereof, whereby there is independent flexibility of the inner rings and their inner surfaces are caused to conform to the periphery of the rod and their outer surfaces caused to conform to the outer ring, thus making an improved closure between the inner surfaces of the inner rings and the rod, and an improved closure of the expansion zone of the inner rings.

2. In a metallic contracting rod packing, the combination of an outer eccentric spring ring having an opening in its thin side and when in expanded working condition of a diameter larger than the diameter of the piston rod with which it is used, an inner eccentric spring ring having an opening in its thin side and at a predetermined side of an imaginary line radially crossing the exact center of the thicker and thinner sides, a duplicate of said inner ring and both mounted side by side within the outer ring so that said imaginary line of each and the thicker and thinner sides match so that the said openings do not come one opposite to the other, whereby their ends overlap, and so that the thicker sides of both are at the thinner side of said outer ring, whereby the inner rings conform to the piston rod wall, and the pair of inner rings when side by side are equal in width to that of the said outer ring, and means for holding said rings from relatively rotating and in concentric form.

3. In a metallic contracting rod packing, spring contracting open ring, open in the thinner portion at one side of an imaginary line crossing radially the center of the thicker and thinner portions, a dowel fixed in one end and in the thinner portion of said outer ring and approximately on said imaginary line and extending inward, an inner eccentric contracting open ring equal in width to one-half that of said outer ring and open in the thinner portion at one side of an imaginaary line crossing the center of the thicker and thinner portions, a groove in a pre-determined side of and in the thicker portion of said inner ring on said imaginary line, a duplicate of said inner ring both mounted side by side within said outer ring with said grooves engaging said dowel, whereby both of said inner rings' imaginary lines are held matched at all times and all three of the rings are held from relatively rotating one to the other, and so that the thicker portion of the outer ring is at the same side as the thinner portion of the pair of inner rings, and so that none of ring openings can open one to the other.

11. In a metallic contracting rod packing, the combination of an outer eccentric spring open ring, open in the thinner portion to one side of an imaginary line crossing radially the center of the thicker and thinner portions and having its inner periphery of a pre-determined true circle when outwardly sprung to its expanded normal working form and having a predetermined width, a dowel fixed in one end and in the thinner portion of said outer ring and approximately on said imaginary line when in said expanded position and extending inward, an inner eccentric spring open ring equal in width to one-half the width of said outer ring and open in the thinner portion at one side of an imaginary line crossing the exact center of the thicker and thinner portions, and having its outer surface a true circle, true to the peripheral size of the inner surface of the outer ring when both are outwardly sprung to normal working form, and having its inner surface a true pre-determined circle of rod size when outwardly sprung to normal working form, a groove in a pre-determined side of and in the thicker portion of said ring on said imaginary line, a duplicate of said inner ring and both mounted side by side within the said outer ring, said grooves engaging the said dowel.

12. In a metallic contracting rod packing, the combination of an outer eccentric spring contracting open ring having when in expanded working condition a diameter greater than the diameter of the rod with which it is used, a plurality of open inner eccentric rod bearing rings each having its inner periphery a true circle when in working position mounted side by side within and surrounded by the said outer spring ring, whereby a tight fit is made between the inner peripheries of the inner rings and the rod wall, the outer peripheries of the inner rings and the inner periphery of the outer ring having true circles at the expansion space zone of the inner rings when in working positions, for the purpose described.

13. In a metallic contracting rod packing, the combination of an open outer spring ring having its inner periphery a predetermined true circle when in its outwardly sprung and expanded normal working form, a pair of open contractable packing rings each having its inner surfaces a true predetermined rod size circle, and the outer side a true circle the same size as that of the said predetermined outer ring inner periphery when in its working position, and mounted side by side within the said outer spring ring, means adapted to hold said rings one to the other against relative rotative circumferential movement, so that the openings do not open one to the other, whereby the inner rings make a gas-tight fit with the rod wall and the outer ring closes the openings in the inner rings gas-tight on their outer sides.

14. As an article of manufacture, a rod bearing eccentric spring open ring having an opening in the thin portion thereof and at one side of an imaginary line crossing the exact centre of the thickest and thinnest portions and having its outer surface a predetermined true circle size when outwardly sprung and expanded to normal working form, and the inner periphery a predetermined rod size true circle when outwardly sprung and expanded to normal working form and having a radial groove opening into the outer periphery of its thick portion and located on said imaginary line, said ring adapted to be used in combinations consisting of two or more of said pieces mounted side by side with openings not opening one to another and yet with the thin and thick sections of each corresponding respectively to the thin and thick sections of each other piece, whereby a new and useful ring packing unit having the sections matching through so that in that respect the assembled ring unit is equivalent to a single eccentric ring, and said ring packing unit having positive seating overlapping sections in the expansion opening zone, is obtained.

15. In a metallic contracting rod packing the combination of a plurality of rod bearing contractable eccentric open rings, with the openings so located in said rings that when properly mounted with the thick portion of each corresponding to the thick portion of every other and the thin portion of each corresponding to the thin portion of every other, the said openings do not open one to the other, surrounded by and mounted within an open contracting outer eccentric the combination of an outer eccentric spring open ring having its inner periphery a true circle when in its expanded normal working form and when in expanded working condition of a diameter greater than the diameter of the rod with which it is used, a pair of open eccentric contracting rod rings each having its outer and inner peripheries true circles when in working position and embraced and mounted side by side within said outer eccentric spring ring, for the purpose described.

4. In a metallic contracting rod packing, the combination of an outer eccentric spring ring open at its thin side and having its inner periphery a true circle when in its expanded normal working form and when in expanded working condition of a diameter greater than the diameter of the rod with which it is used, a pair of eccentric contractable packing rings open at their thin sides and each having its inner and outer peripheries true circles when in working position and mounted side by side within said outer eccentric spring ring, for the purpose described.

5. In a metallic contracting rod packing, the combination of an outer eccentric spring ring open in its thin side and having its inner periphery a true circle when in its outwardly sprung expanded normal working form and when in expanded working condition of a diameter larger than the diameter of the rod with which it is used, a pair of open eccentric contractable packing rings each having inner and outer peripheries of true circles when in working position and mounted side by side within said outer eccentric spring ring, and means adapted to hold said rings one to the other against relative circumferential movement so that the openings cannot open one to the other, for the purpose described.

6. In a metallic contracting rod packing, the combination of an outer eccentric spring ring open at its thin side and having its inner periphery a true circle when in its expanded normal working form and when expanded to working form of a diameter larger than the diameter of the rod with which it is used, a pair of eccentric rod bearing inner spring rings open at their thin sides and having their outer surfaces a true circle when in expanded normal working form and the same size as the inner periphery of the outer ring and the inner peripheries a true circle when in expanded normal working form and of a size of a predetermined rod with which they are to work, said inner rings embraced side by side within said outer ring so that the thick side of each of said inner rings is at the open and thin side of said outer ring and arranged so that the openings do not open one to the other, and means adapted to hold said rings from relative rotative circumferential movement of one to the other and in concentric form.

7. As an article of manufacture, an inner rod bearing eccentric contractable open packing ring adapted to be used with other rod bearing packing ring units within an outer contracting spring ring, said article of manufacture having an opening in the thin portion thereof, and at one side of an imaginary line crossing the exact centers of the thickest and thinnest portions, said opening being sufficiently far from the position of said imaginary line that, when combined with another open rod bearing eccentric ring packing unit open in its thin side, so that the thick and thin sections of each are in lateral contact respectively with one another, the openings in the first and second rod bearing ring packing units will not open one to the other, whereby the ends of the said ring packing units laterally over lap, thus forming a positive seating seal or joint, but the said off-set opening in the said article of manufacture being sufficiently near the said thinnest portion of the said article that a nonexpansive club-end of metal is not formed between the said off-set opening and the said thinnest portion of the said article.

8. In a metallic contractable rod packing, the combination of an outer spring contracting open ring having when expanded to normal working position a diameter larger than the diameter of the rod with which it is used, a plurality of open inner rod bearing rings each having its inner periphery a true circle when in working position mounted side by side within said outer spring ring, whereby a tight fit is made between the inner peripheries of the inner rings and the rod wall, the outer peripheries of the inner rings and the inner periphery of the inner outer ring having true circles at the expansion zone of the inner rings when in working positions, for the purpose described.

9. In a metallic contracting rod packing, the combination of an outer eccentric spring contracting open ring, having when in expanded working condition a diameter larger than the diameter of the rod with which it is used, a plurality of open inner rod bearing rings each having its inner periphery a true circle when in working position mounted side by side within the said outer spring ring, whereby a tight fit is made between the inner peripheries of the inner ring and the rod wall, the outer peripheries of the inner rings and the inner periphery of the outer ring having true circles at the expansion zone of the inner rings when in working positions, for the purpose described.

10. In a metallic contracting rod packing, the combination of an outer eccentric spring ring, approximately equal in width to the width of the plurality of rod bearing rings, said outer ring adapted to contract around said inner rings, the adjacent lateral surfaces of said rod bearing rings adapted to seat one against the other and the lateral surface of the assembled ring adapted to seat against the groove wall, the inner surface of the rod bearing rings adapted to seat against said rod and the adjacent circular surfaces of the outer and inner rings adapted to seat one against the other, for the purpose of preventing leakage of the fluid or vapor past the packing.

16. In a metallic contracting rod packing the combination of an outer eccentric spring contracting ring having, when in expanded working condition, an internal diameter greater than the diameter of the rod with which it is to be used, said ring adapted to be mounted about and to contract on a plurality of open contractable rod bearing inner rings, each having its opening in the thin portion of the ring; said inner rings being mounted side by side with openings not opening one to another; and yet with the thin and thick section of each corresponding respectively to the thin and thick section of each other inner ring piece; said inner ring pieces thus forming an inner ring packing unit equivalent to a single eccentric ring in flexibility and spring; and also having positive seating over lapping surfaces in the expansion opening zone; said inner eccentric packing ring unit and said outer contracting eccentric spring ring, being so arranged one to the other that the thick portion of the said outer ring is in contact with the thin open portion of the said inner rings, the thin open portion of the said outer ring is in contact with the thick portion of the said inner ring packing unit, and the assembled ring packing unit as a whole, is approximately concentric, thus providing a new and improved packing with a lateral surface of approximately uniform width throughout, with positively overlapping surfaces to prevent leakage of fluid or vapor, and with a double eccentric construction providing flexibility and spring.

In testimony whereof I hereunto affix my signature in the presence of two witnesses.

STEWART S. KURTZ, Jr.

Witnesses:
C. P. RHOADS,
J. A. JORDAN.